(12) United States Patent
Cheung

(10) Patent No.: US 7,882,585 B2
(45) Date of Patent: Feb. 8, 2011

(54) FOOTWEAR INCORPORATING A LIGHT SOURCE AND METHODS FOR MANUFACTURING THE SAME

(76) Inventor: James Cheung, 5 Boxwood Way, Warren, NJ (US) 07059

( * ) Notice: Subject to any disclaimer, the term of this patent is extended or adjusted under 35 U.S.C. 154(b) by 0 days.

(21) Appl. No.: 12/754,153

(22) Filed: Apr. 5, 2010

(65) Prior Publication Data

US 2010/0251492 A1    Oct. 7, 2010

Related U.S. Application Data

(60) Provisional application No. 61/167,272, filed on Apr. 7, 2009.

(51) Int. Cl.
- A43D 8/00 (2006.01)
- A43B 9/18 (2006.01)
- A43B 23/00 (2006.01)

(52) U.S. Cl. .......... 12/146 B; 12/146 C; 36/137; 36/4; 362/103

(58) Field of Classification Search .......... 36/137, 36/136, 132; 12/146 B, 146 C; 362/103, 362/191, 84

See application file for complete search history.

(56) References Cited

U.S. PATENT DOCUMENTS

| | | | |
|---|---|---|---|
| 1,584,626 A * | 5/1926 | MacPherson | 36/32 R |
| 1,642,013 A * | 9/1927 | Collins | 425/390 |
| 1,735,986 A * | 11/1929 | Wray | 36/14 |
| 1,770,655 A * | 7/1930 | Nielsen | 425/119 |
| 2,525,609 A * | 10/1950 | Lewis | 425/119 |
| 2,607,130 A * | 8/1952 | Pearson | 36/1 |
| RE28,236 E | 11/1974 | Henricks | |
| 4,026,044 A | 5/1977 | Senter | |
| 4,068,395 A | 1/1978 | Senter | |
| 4,333,192 A * | 6/1982 | Stockli et al. | 12/142 E |
| 4,831,750 A | 5/1989 | Muller | |
| 4,858,337 A * | 8/1989 | Barma | 36/4 |
| 5,285,586 A | 2/1994 | Goldston et al. | |
| 5,303,485 A | 4/1994 | Goldston et al. | |
| 5,720,121 A * | 2/1998 | Barker | 36/137 |
| 5,743,027 A * | 4/1998 | Barma | 36/4 |
| 5,746,499 A * | 5/1998 | Ratcliffe et al. | 362/103 |
| 5,813,148 A | 9/1998 | Guerra | |
| 5,879,069 A | 3/1999 | Chien | |
| 5,930,921 A | 8/1999 | Sorofman et al. | |
| 6,030,089 A | 2/2000 | Parker et al. | |

(Continued)

OTHER PUBLICATIONS

International Search Report from PCT/US2010/029944 dated May 21, 2010.

*Primary Examiner*—Jila M Mohandesi
(74) *Attorney, Agent, or Firm*—Greenberg Traurig, LLP

(57) ABSTRACT

An embodiment of the present invention is a method that includes the steps of: incorporating at least one light source, having a light emitting source that is capable of illuminating, in an upper part of a shoe that includes: 1) the upper part, 2) at least one bonding strip, and 3) a shoe bottom sole part; assembling at least the upper part with the at least one bonding strip and the shoe bottom sole part to form an assembled unit; and c) applying sufficient heat to vulcanize the assembled unit so as to result in securing the upper part to the at least one bonding strip and the shoe bottom sole part to form the shoe having the at least one light source that is capable of illuminating.

1 Claim, 11 Drawing Sheets

U.S. PATENT DOCUMENTS

2008/0019119 A1* 1/2008 Marston .................. 362/103
2008/0307670 A1* 12/2008 Duclos ........................ 36/4
2009/0288317 A1 11/2009 Forbes

* cited by examiner

FOOTWEAR INCORPORATING A LIGHT SOURCE AND METHODS FOR MANUFACTURING THE SAME

RELATED APPLICATIONS

This application claims the benefit of U.S. provisional application Ser. No. 61/167,272 filed Apr. 7, 2009, and entitled "PROCESS FOR MANUFACTURING LIGHTED VULCANIZED AND HIGH TEMPERATURE FOOTWEAR," which is hereby incorporated herein by reference in its entirety for all purposes.

TECHNICAL FIELD

The present invention relates to a method for incorporating and protecting temperature sensitive electronic illumination circuits into footwear before or after undergoing a high temperature curing/vulcanization process.

BACKGROUND

Light emitting diode and other forms of illuminated footwear have become very popular especially among children. Essentially, all illuminated footwear includes several basic components such as light sources, batteries, sequential drivers, and motion switches. There are numerous styles of shoes that this illuminated technology may be implemented upon.

SUMMARY OF INVENTION

Some embodiments of the present invention include methods for inserting electronic parts, such as wires, circuits, etc., into shoe components prior to or after a high temperature manufacturing process. Some embodiments of the present invention, using the methods in accordance with the invention may save time and money in the overall manufacture process. Some embodiments of the present invention, the electronic parts are covered, encapsulated, and/or shielded from the heat by using one or more means for shielding against heat.

Some embodiments of the present invention include a method, comprising the steps of: a) incorporating at least one light source in an upper part of a shoe, i) wherein the at least one light source comprises: 1) a light emitting source that is capable of illuminating, 2) a conductive medium, and 3) a connector, ii) wherein the shoe comprises: 1) the upper part, 2) at least one bonding strip, and 3) a shoe bottom sole part, and iii) wherein the at least one bonding strip and the shoe bottom sole part are composed at least in part of a rubber composition; b) assembling at least the upper part having the at least one light source that is capable of illuminating with the at least one bonding strip and the shoe bottom sole part to form an assembled unit; and c) applying sufficient heat to vulcanize the assembled unit having the at least the upper part having the at least one light source so as to result in securing the upper part to the at least one bonding strip and the shoe bottom sole part to form the shoe having the at least one light source that is capable of illuminating.

Some other embodiments of the present invention include a method, comprising the steps of: a) incorporating at least one light source in at least one of: i) an shoe bottom sole part of a shoe, and ii) at least one bonding strip of the shoe, iii) wherein the at least one light source comprises: 1) a light emitting source that is capable of illuminating, 2) a conductive medium, and 3) a connector, iv) wherein the shoe comprises: 1) the upper part, 2) at least one bonding strip, and 3) a shoe bottom sole part, and v) wherein the at least one bonding strip and the shoe bottom sole part are composed at least in part of a rubber composition; b) assembling at least the upper part having the at least one light source that is capable of illuminating with the at least one bonding strip and the shoe bottom sole part to form an assembled unit; and c) applying sufficient heat to vulcanize the assembled unit having the at least the upper part having the at least one light source so as to result in securing the upper part to the at least one bonding strip and the shoe bottom sole part to form the shoe having the at least one light source that is capable of illuminating.

Some other embodiments of the present invention include a method, comprising the steps of: a) incorporating at least one light source in at least one of: i) an shoe bottom sole part of a shoe, ii) at least one bonding strip of the shoe, and iii) an upper part of a shoe, iv) wherein the at least one light source comprises: 1) a light emitting source that is capable of illuminating, 2) a conductive medium, and 3) a connector, v) wherein the shoe comprises: 1) the upper part, 2) at least one bonding strip, and 3) a shoe bottom sole part, and vi) wherein the at least one bonding strip and the shoe bottom sole part are composed at least in part of a rubber composition; b) assembling at least the upper part having the at least one light source that is capable of illuminating with the at least one bonding strip and the shoe bottom sole part to form an assembled unit; and c) applying sufficient heat to vulcanize the assembled unit having the at least the upper part having the at least one light source so as to result in securing the upper part to the at least one bonding strip and the shoe bottom sole part to form the shoe having the at least one light source that is capable of illuminating.

In one embodiment, upon the completion of the vulcanization step and while the shoe remains at a temperature that is substantially close to the temperature of the sufficient heat, the method further includes connecting the at least one protected light source through the connector to a circuit for selectively electrically connecting a power source with the at least one light source so that to result in illuminating the at least one light source, wherein the circuit and the power source are incorporated into the shoe.

Some other embodiments of the present invention include a method, comprising the steps of: a) assembling at least an upper part of a shoe with at least one bonding strip and a shoe bottom sole part to form an assembled unit, i) wherein the shoe comprises: 1) the upper part, 2) at least one bonding strip, and 3) a shoe bottom sole part, and ii) wherein the at least one bonding strip and the shoe bottom sole part are composed at least in part of a rubber composition; b) applying sufficient heat to vulcanize the assembled unit so as to result in securing the upper part to the at least one bonding strip and the shoe bottom sole part to form the shoe; and c) incorporating, upon the completion of the vulcanization step and while the shoe remains at a temperature that is substantially close to the temperature of the sufficient heat, at least one light source in at least one of: i) an shoe bottom sole part of a shoe, ii) at least one bonding strip of the shoe, and iii) an upper part of a shoe, iv) wherein the at least one light source comprises: 1) a light emitting source that is capable of illuminating, 2) a conductive medium, and 3) a connector, and v) wherein, after incorporating, the shoe having the at least one light source that is capable of illuminating.

In one embodiment, the method further includes connecting the at least one protected light source through the connector to a circuit for selectively electrically connecting a power source with the at least one light source so that to result in illuminating the at least one light source, wherein the circuit and the power source are incorporated into the shoe.

In one embodiment, the at least one light source are sufficiently designed to test the working of themselves, after the completion of the vulcanization step.

In one embodiment, the protecting step comprising a step of coating with the heat resistant material the at least one light source.

In one embodiment, the heat-resistant material is a non-conductive, flame retardant, or thermo-insulating material.

Some other embodiments of the present invention include a shoe that includes a) an upper part, b) at least one bonding strip, c) a shoe bottom sole part, wherein the at least one bonding strip and the shoe bottom sole part are composed at least in part of a rubber composition, wherein the upper part incorporates at least one light source, wherein the at least one light source comprises: 1) a light emitting source that is capable of illuminating, 2) a conductive medium, and 3) a connector, wherein the at least one light source is sufficiently covered by at least one heat-resistant material, and wherein the at least one heat-resistant material has a composition that is sufficiently designed to provide a sufficient protection to the at least one light source from a functional damage when heat is applied during a vulcanization of the shoe.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Figure 1A:
FIGS. 1A-1D show schematic diagrams of a shoe made according to one embodiment of the present invention.
Figure 1B:
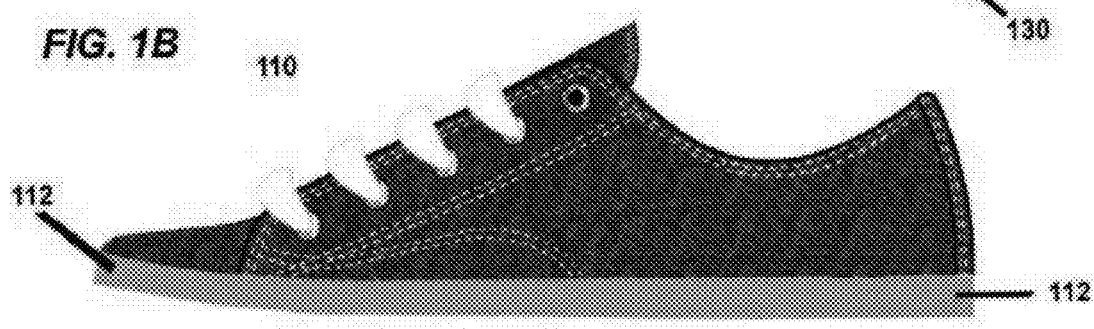
Figure 1C:
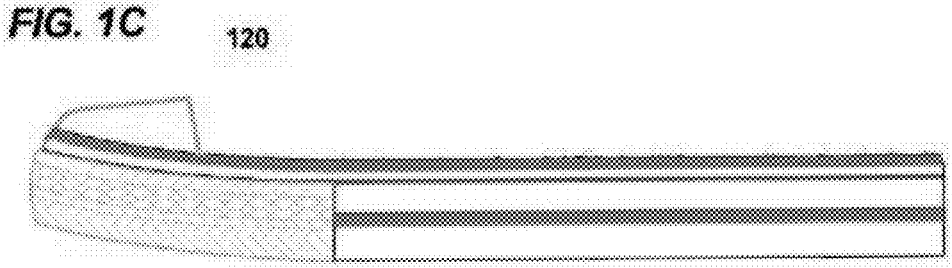
Figure 1D:
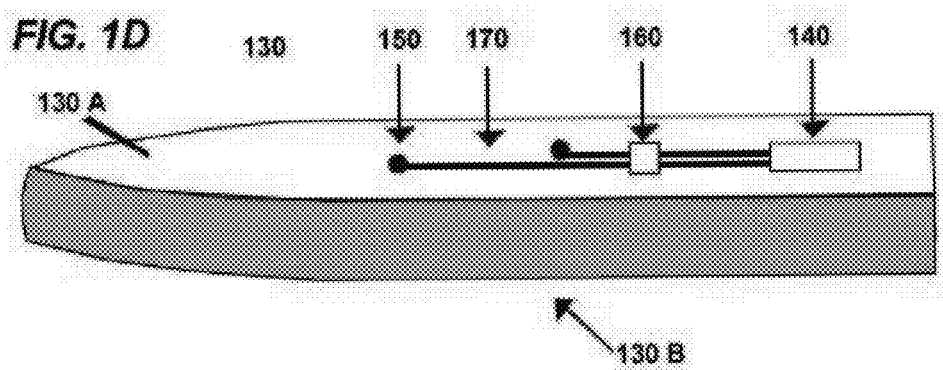

FIGS. 1A-1D show schematic diagrams of a shoe made according to one embodiment of the present invention. The shoe 100 has a three-layer design with an upper portion 110, bonding layer strips (foxing) 120, and a lower outsole (bottom) 130. As illustrated, three components 110, 120, and 130 are in direct contact with one another and are joint together to form a unitary construction by vulcanization. FIGS. 1B, 1C, and 1D illustrate the individual 110, 120, and 130, respectively.

FIG. 1B shows an exemplary structure of the upper portion 110 according to one embodiment. The upper portion 110 includes a bottom 112 interface with the lower outsole 130.

Referring to FIG. 1D, the lower outsole 130 is shown in this embodiment to have a top surface 130A for interfacing with the upper portion 110 and a bottom surface 130B operating as the bottom working surface of the shoe 100. This lower outsole 130 is formed of rubber and is vulcanized during the vulcanization process to be cured and to join with the upper portion 110 by the vulcanization of the overlapping foxing 120.

Suitable rubber materials of the shoe components 110, 120, and 130, include, but not limited to, any suitable rubber composition, such as natural rubber, synthetic rubber, or any type of elastomer. An elastomer is a material with the mechanical (or material) property that it can undergo much more elastic deformation under stress than most materials and still return to its previous size without permanent deformation. Natural rubber coming from latex is mostly polymerized isoprene with a small percentage of impurities in it. Synthetic rubber, for example, can be made from the polymerization of a variety of monomers including isoprene (2-methyl-1,3-butadiene), 1,3-butadiene, chloroprene (2-chloro-1,3-butadiene), and isobutylene (methylpropene) with a small percentage of isoprene for cross-linking. These and other monomers can be mixed in various desirable proportions to be copolymerized for a wide range of physical, mechanical, and chemical properties. The monomers can be produced pure and the addition of impurities or additives can be controlled by design to give optimal properties. Polymerization of pure monomers can be better controlled to give a desired proportion of cis and trans double bonds. Table 1 provides examples of some common synthetic rubbers.

TABLE 1

Common synthetic rubbers

| ISO Standard Code | Technical Name | Common Names |
| --- | --- | --- |
| BIIR | Bromo Isobutylene Isoprene | Bromobutyl |
| BR | Polybutadiene | Buna CB |
| CIIR | Chloro Isobutylene Isoprene | Chlorobutyl, Butyl |
| CR | Polychloroprene | Chloroprene, Neoprene |
| CSM | Chlorosulphonated Polyethylene | Hypalon |
| ECO | Epichlorohydrin | ECO, Epichlorohydrin, Epichlore, Epichloridrine |
| EP | Ethylene Propylene | |
| EPDM | Ethylene Propylene Diene Monomer | EPDM, Nordel |
| FKM | Fluoronated Hydrocarbon | Viton, Kalrez, Fluorel |
| FVQM | Fluoro Silicone | FVQM |
| HNBR | Hydrogenated Nitrile Butadiene | HNBR |
| IR | Polyisoprene | (Synthetic) Natural Rubber |
| IIR | Isobutylene Isoprene Butyl | Butyl |
| MVQ | Methyl Vinyl Silicone | Silicone Rubber |
| NBR | Acrylonitrile Butadiene | NBR, Nitrile rubber, Perbunan, Buna-N |
| PU | Polyurethane | PU, Polyurethane |
| SBR | Styrene Butadiene | SBR, Buna-S, GRS, Buna VSL, Buna SE |
| SEBS | Styrene Ethylene/Butylene Styrene | SEBS Rubber |
| SI | Polysiloxane | Silicone Rubber |
| XNBR | Acrylonitrile Butadiene Carboxy Monomer | XNBR, Carboxylated Nitrile |

Such rubber may be chemically treated or "cured" by reacting with a vulcanizing agent such as sulfur. This curing process is used to achieve the desired properties in the treated rubber, including elasticity, resistance to certain solvents, diminished surface tackiness, durability under low and high temperatures, resistance to rot or decay, and increased tensile strength. The curing process essentially causes cross-linkages between the polymer chains of the rubber molecules. In addition to using sulfur as the vulcanizing agent, other agents, including certain peroxides, gamma radiation, and several other organic compounds, may also be used in the vulcanization process in this application.

The vulcanization process is used to join contact surfaces of the shoe components 110, 120, and 130, to form a unified structure, the complete shoe. For example, the upper portion 110, the foxing 120 and the lower outsole 130 may have portions that may overlap the between the two sections, for example between the upper 110 and the lower outsole 130. The overlapping rubber (foxing) 120 may be treated with sulfur or other curative additives to assist in the vulcanization process. The exposure to high temperatures melts the overlapping layer (foxing) 120 of rubber, thereby bonding and fusing the upper portion of the shoe to the sole.

Thus, a typical method for constructing a rubber shoe is, therefore, as follows. An lower outsole 130 is put upon the last and an uncured shoe or boot upper is positioned so as to adhesively overlap the upper portion 110. An uncured foxing band 120, or flat band of rubber (e.g., 1-2 inches in width), is then placed around the outer periphery or rim of the upper portion 110. An uncured binder or filler is then placed unto the lower outsole 130. The binder or filler will not normally extend beyond the exposed surface of the lower outsole 130. An uncured layer (foxing) rubber 120 is then wrapped over the projecting edge of the outsole onto the upper. The resulting uncured rubber assembly (which has the appearance of a crudely formed footwear product) is then vulcanized upon the last, typically for about 1-2 hours at temperatures ranging from about 120-180 degrees Celsius to form the final shoe product. In the vulcanizing process, the component parts of the rubber footwear product are chemically and physically melded into a complete shoe of unitary construction.

Further, in one embodiment of the invention, at least one light source 140 is incorporated into the lower outsole 130. In another embodiment, the at least one light source 140 may include, but not limited to, at least one light emitting source 150 that is capable of illuminating, at least one conductive medium 170, which connects the light emitting resource 150 to a connector 160. In an embodiment, the connector 160 connects the light source 150 to an electrical circuit (e.g. CPU) and or power source 140 In another embodiment, suitable light emitting source 150 includes, but not limited to, Light Emitting Diode (LED), electroluminescent (EL), Organic Light Emitting Diode (OLED), and or any other suitable light emitter. The suitable conductive media 170 includes, but not limited to, electrical wires, conductive films, printed circuits, and likewise. The electrical parts 140, 150, 160 and 170 are protected prior to a vulcanization process that is used to join show components 110, 120, and 130 into the complete shoe. The protection of the electrical parts 140, 150, 160 and 170 may be performed by coating them with or encapsulating them into a heat-resistant material which possesses at least non-conductive, flame retardant, or thermo-insulating properties. The electrical parts 140, 150, 160 and 170 incorporated in accordance with the embodiment of the present invention remains functional despite being subjected to vulcanization process. For example, the light emitting source 150 remains capable of illuminating after the vulcanization process.

For purposes of this invention, the heat-resistant material is defined to be a material that covers an electrical component so that to provide sufficient protection to the electrical component from functional damage due to heat. In one embodiment, for example, using the heat-resistance material around the light emitting source 150 allows the light emitting source 150 remains capable of illuminating after the vulcanization process. In some embodiments, suitable heat-resistant materials include, but not limited to, any suitable composition such as silicone rubber, silicone tape, terpene phenolic resin, fiberglass, ceramics, ceramic paste, ceramic fiber, or any other suitable a non-conductive, flame retardant, thermo-insulation material.

For example, in one embodiment, silicone rubber may be used to insulate temperature sensitive electronic circuits since silicone rubber has high temperature resistance and acts as insulation barrier preventing heat from destroying or otherwise depredating the electronic circuit. In another embodiment, a non-cured liquid or gel silicone rubber may be used to fill in every detail of the electronic circuit that requires protection. When cured the silicone rubber is durable, flame resistant, has low shrinkage, and has high Tear strength. In another embodiment, the heat resistant material is applied around soldering joints in the lights source 140: for example, around joints that connect the conductive medium 170 to the light emitting resource 150 and to the connector 160.

Accordingly, in one embodiment of the invention, a process for fabricating the shoe 100 in FIG. 1A may include the following steps. First, the at least one electrical part 140 is protected with the heat-resistant material and incorporated into, or placed onto, the lower outsole 130. Second, the upper portion 110 and the lower outsole 130 are interface with one another. Third, layers of bonding strips (foxing) 120 wrapped around overlapping the upper 110 and lower outsole 130. Next, the vulcanization process is performed to cure the rubber parts and to join the parts 110, 120, and 130 as a unitary structure. Finally, other steps are performed to complete the shoe 100.

In other embodiments, the present invention includes methods for inserting temperature sensitive electronics into shoes after vulcanization process but while the shoe remains at a substantially elevated temperature. In another embodiments, the present invention includes methods for inserting temperature sensitive electronics into shoes after vulcanization process but while the shoe remains at a temperature which is substantially close to vulcanization temperature. In another embodiments, the present invention includes methods for inserting temperature sensitive electronics into shoes after vulcanization process but while the shoe remains at a temperature above 30-50 degrees Celsius. In some embodiments, temperature sensitive electronics remain functional after being inserted into shoes after vulcanization process but while the shoe remains at a temperature above 30-50 degrees Celsius.

In other embodiments, the present invention includes methods when, in a case of electrical device having several parts, some electrical parts (e.g. wires) of the overall electronic device may be incorporated into, for example, the upper portion 110 before or after the vulcanization process. Then, after the shoe is cooled to a particular temperature, the remaining parts of the electronic device may be incorporated through the lower outsole 130 to complete the assembly of the electronic device.

In some embodiments, inserting electrical parts, such as circuits prior to or after the vulcanization process, may save time and money in the overall manufacture process.

In some embodiment electrical parts can be incorporated, for example, in the upper portion 110, and/or in the foxing 120, and/or the lower outsole 130, and/or in more than one portion of the shoe.

In some embodiments of the present invention further include means for testing the installed electronic circuits. These means may include methods of incorporating, for example, exposed prongs or pads in the lower sole 130 of the shoe or other suitable location to test for battery strength. In some other embodiments, the testing means may include observing luminosity on an illumination source.

Figure 2:
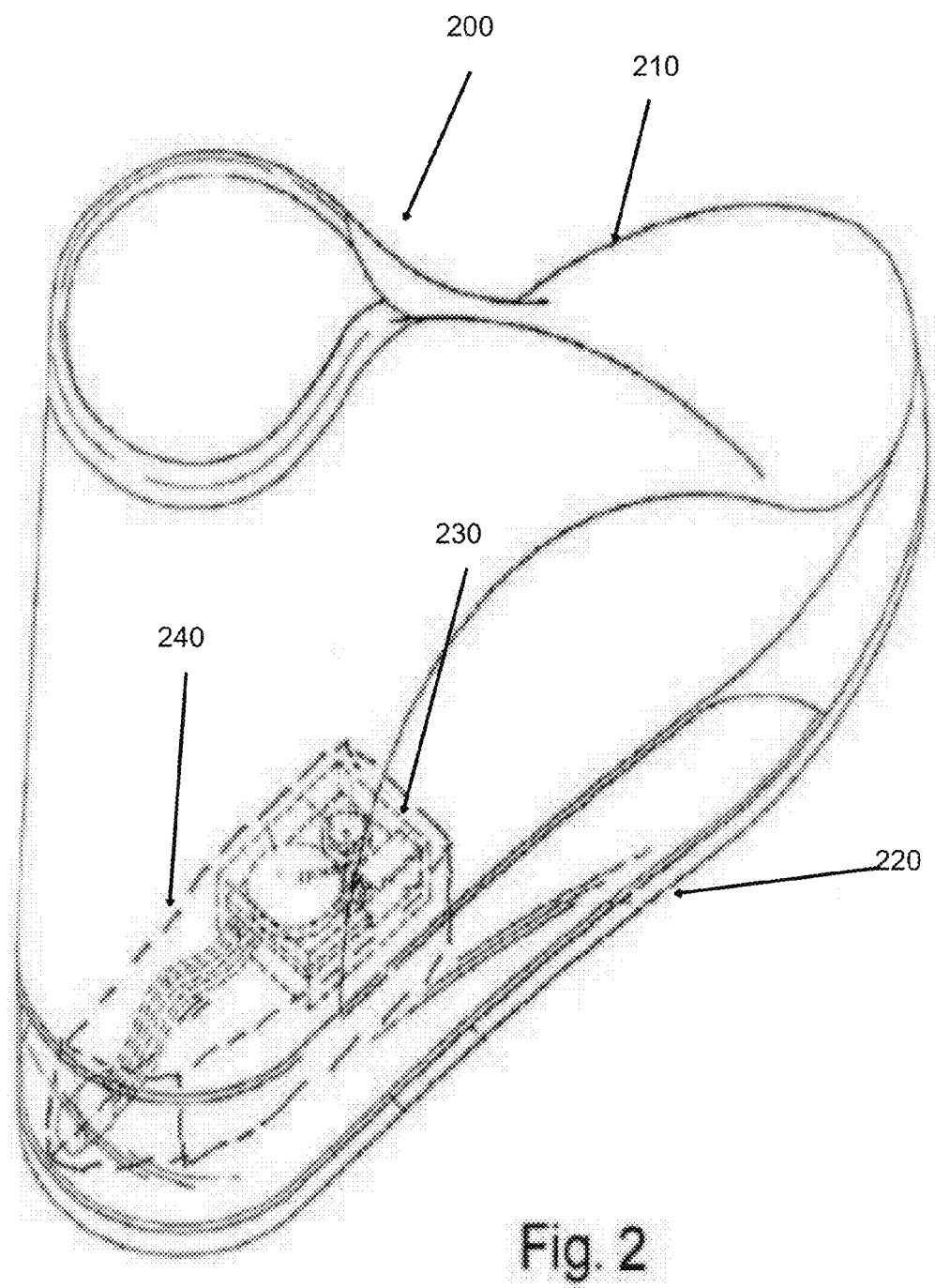
FIG. 2 shows a schematic diagram of a shoe made according to one embodiment of the present invention.

FIG. 2 shows a schematic diagram of a complete shoe made according to one embodiment of the present invention. In the embodiment, a shoe 200 may have a top component 210 and a bottom component 220, a sole. Prior to or after the vulcanization process, a light source 240 may be incorporated into the sole 220. The light source 240 and circuits 230 is protected with a capsule made from the heat-resistant material.

Figure 3:
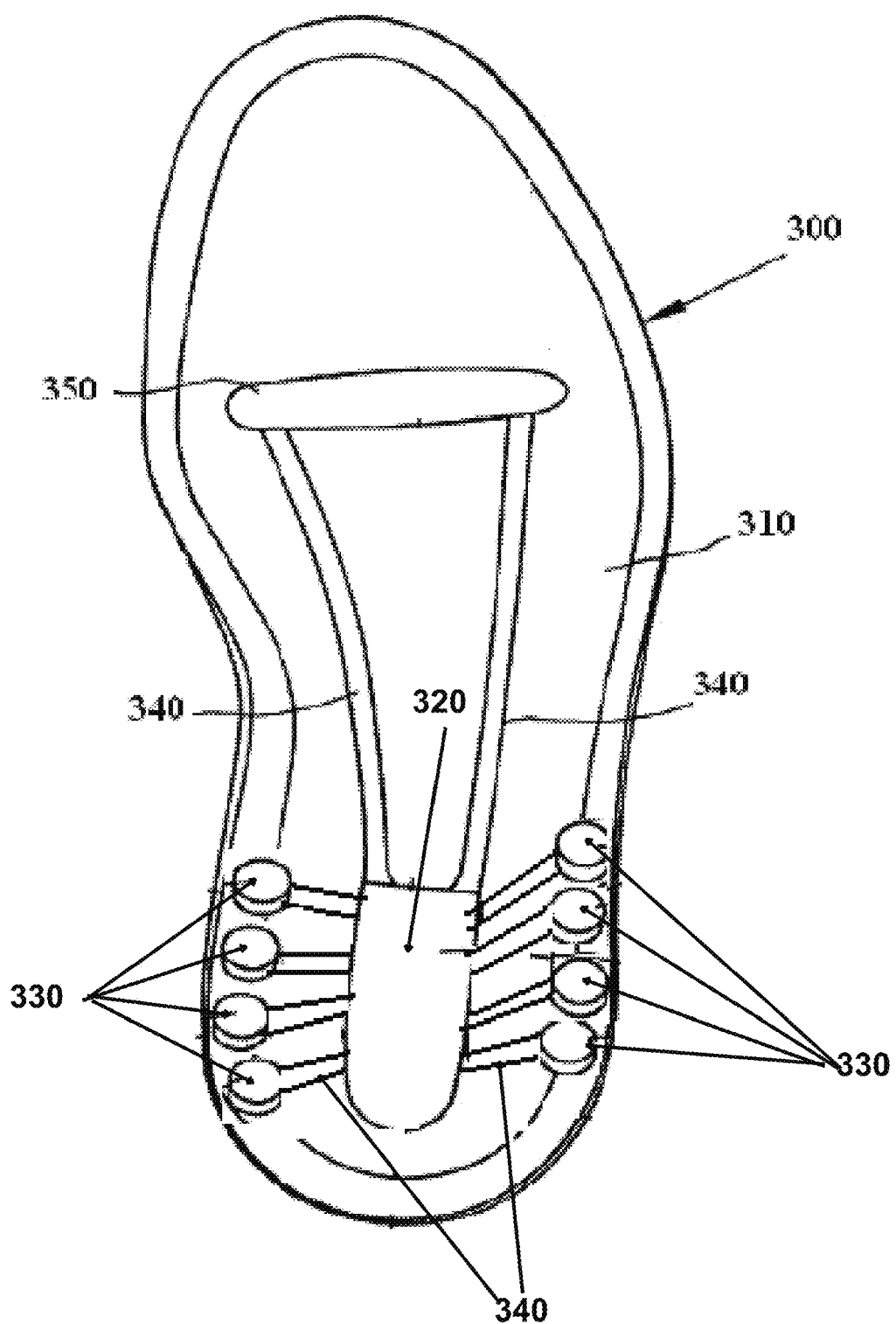
FIG. 3 shows a top view of a component of a shoe made according to one embodiment of the present invention.

FIG. 3 shows a schematic diagram of a component of a shoe to be used in accordance with one embodiment of the present invention. In the embodiment, the shoe component 300 has several electrical parts: 320 (a CPU), 330 (LED or EL), 340 (wires), and 350 (a motion sensor) that may be incorporated within a cavity 310 of the shoe component 300 prior to or after the vulcanization process. In one embodiment, each electrical component is separately protected with the heat-resistant material. In another embodiment there is a single protective cover that engulfs all electronic parts.

Figure 4:
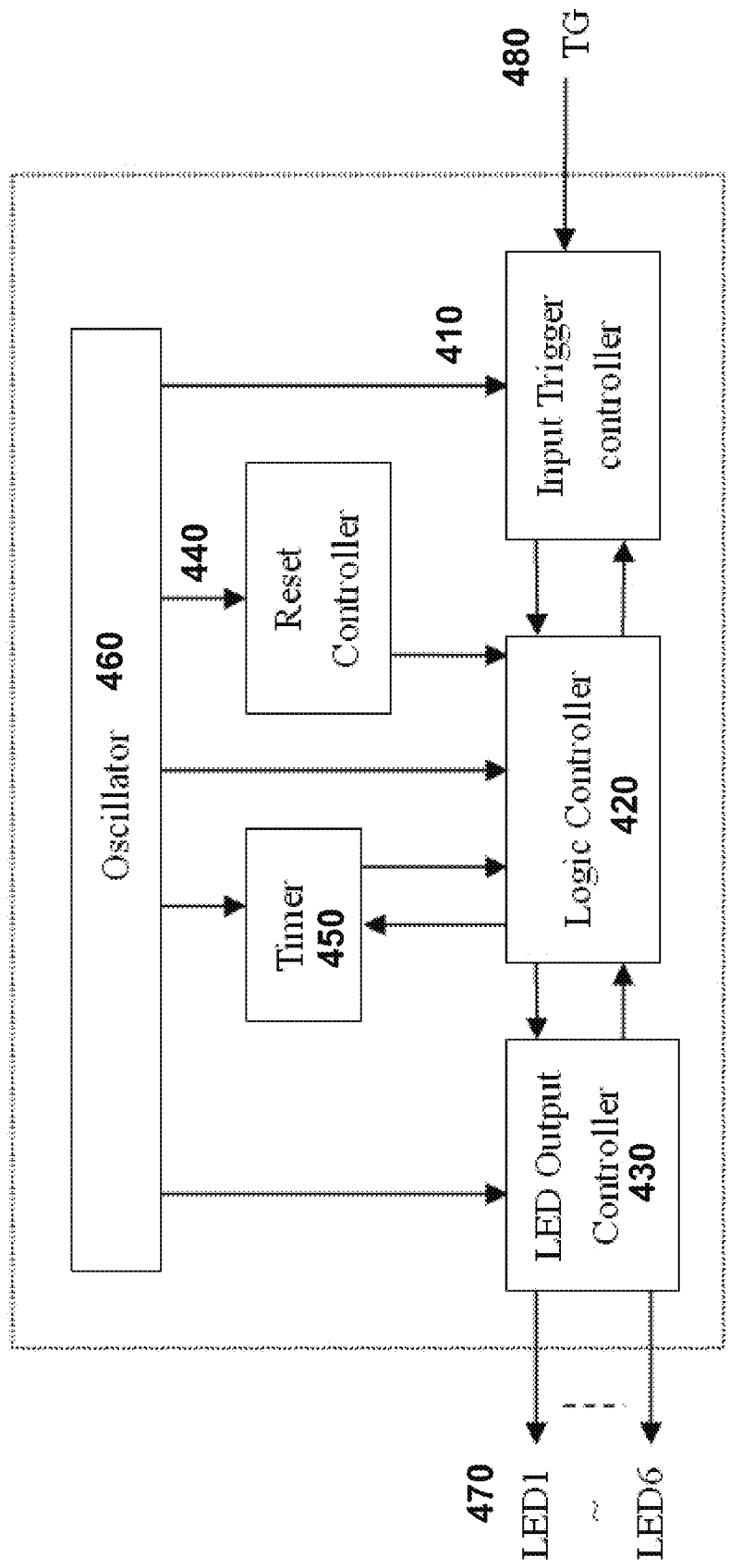
FIG. 4 shows a schematic diagram of electrical parts incorporated into a shoe made according to one embodiment of the present invention.
Figure 5:
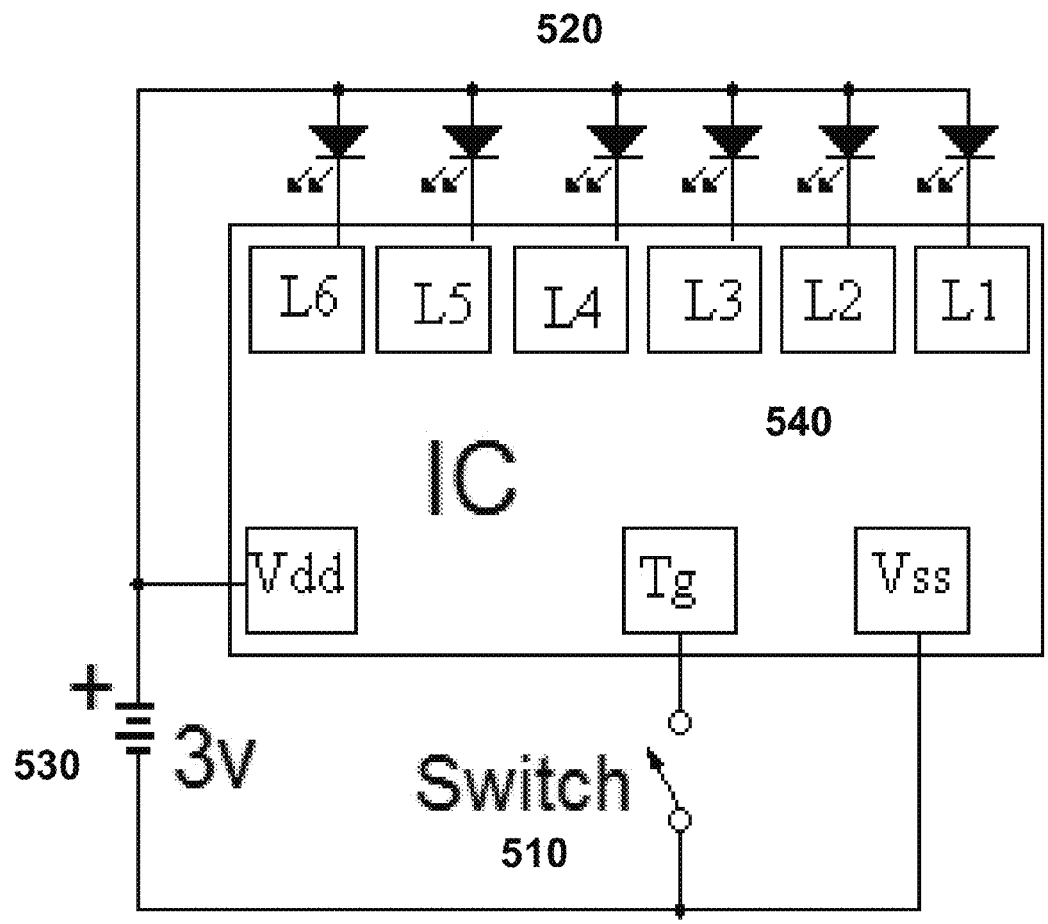
FIG. 5 shows a schematic diagram of electrical parts incorporated into a shoe made according to one embodiment of the present invention.

FIGS. 4 and 5 show sample schematic diagrams of electrical parts that may be incorporated into a shoe made according to one embodiment of the present invention.

According to an aspect of the present invention, electrical parts that may be incorporated into a shoe are combined into an interactive shoe light device that includes at least one power source, at least one motion switch to generate an activation signal in response to an electrical engagement within the at least one motion switch, the activation signal indicating at least one of duration of electrical engagement within the at least one motion switch, an integrated circuit functioning as a controller, the integrated circuit electrically connected to the at least one motion switch to receive the activation signal, and lighting elements electrically connected to the integrated circuit. The lighting elements selectively actuated by the integrated circuit to illuminate the lighting elements in one or more predetermined illumination patterns dependant on the duration of electrical engagement indicated by the activation signal. For a short duration of electrical engagement all lighting elements flash in a flashing pattern for a pre-determined period and for a long duration of electrical engagement only one lighting element lights up or flashes and continues for a few seconds after the switch is opened. The flashing pattern and the flashing duration are not interrupted by a short duration of electrical engagement.

According to another aspect, a method of illuminating a series of lighting elements includes creating a first activation signal based on electrical engagement within a first motion switch, based on the first activation signal, determining a duration of electrical engagement within the first motion switch for a period of time, and illuminating a least one of a series of lighting elements in response to activation of the first motion switch. For a short duration of electrical engagement all lighting elements flash in a flashing pattern for a pre-determined period and for a long duration of electrical engagement only one lighting element lights up or flashes and continue for a few seconds after the switch is opened. The flashing pattern and the flashing duration are not interrupted by a short duration of electrical engagement.

As shown in FIG. 4, an interactive shoe light device 400 includes an input trigger controller 410, a logic controller 420, a LED output controller 430, a reset controller 440, a timer, 450, an oscillator 460, six LEDs 470, and a trigger 480. In general, movement of a foot triggers the input trigger controller 410. The controller 420 analyzes the movement of input trigger controller 410, and in response to that general movement, illuminates the series of lighting elements 470 in one or more predetermined patterns. In one example, the interactive shoe light device 400 is incorporated in a shoe or other footwear. The controllers 410-460 are incorporated, for example, in the shoe sole and the lighting source, LEDs, 470 are positioned along sides of the shoe for maximum visibility.

In some embodiments, the trigger switch 480 is an inertia switch such as a spring motion switch, but any motion switch 480 known in the art can be used such as magnetic reed switch or a ball switch. If a magnetic reed switch is used, at least two magnetic contacts having a free end and a fixed end are positioned proximate to each other so that the free ends of the metal contacts electrically engage due to the magnetic flux of a magnet when the magnet is placed near the free ends of the two magnetic contacts. In this manner, the reed switch is actuatable by the magnet. In some embodiments, the magnet is incorporated in a specially designed housing within at least one shoe component to hold the magnet. In one example, an internal magnet is placed within the shoe to sense motion of the switch. Typically, the housing holding the interior magnet defines a space to allow the magnet to move along the axis of the housing during movement. In another example, an external magnet is placed outside the shoe. Preferably, the external magnet is fixed in a specially designed housing to allow the user to move the magnet near the magnetic reed switch to cause an electrical engagement within the magnetic reed switch which generates a signal to actuate the integrated circuits.

Referring again to FIG. 4, in some embodiments, the interactive shoe light device 400, the logic controller 420 analyzes the activation signal which the input trigger controller 410 detects from the motion switch 480 and the LED output controller 430 receives commands from the logic controller 420 and generates a dependant illumination pattern. In particular, in some embodiments, the logic controller 420 preferably determines the duration of electrical engagement within the switch 480 from each pulse in the activation signal. In response to the duration of each electrical engagement, the logic controller 420 commands the LED output controller 430 to illuminate the lighting elements 470 in one or more predetermined lighting patterns.

In one example, the signal analysis system 400 an input trigger controller 410, a logic controller 420, a LED output controller 430, a reset controller 440, a timer, 450, an oscillator 460, six LEDs 470, and a trigger 480. Initially, the input trigger controller 410 receives the activation signal from the motion switch 480. In response, the trigger circuit 410 actuates the oscillator 460, and the logic controller 420. In some embodiments, when activated, the oscillator 460 creates a frequency signal with a time period dependant on an oscillation resistor. In some embodiments, the oscillator resistor can be modified to any value to adjust the frequency signal.

In some embodiment, however, the logic controller 420 may be programmed to interrupt the lighting sequence and illuminate one lighting element when signaled by the timer 450. For example, in response to a long contact signal, the timer 450 sends a control signal to the logic controller 420, which enables the LED output controller 430 to actuate one pre-determined lighting sources 470. This lighting sources 470 will be sequentially flashing or illuminating continuously. Moreover, when the switch 480 opens, the light sources 480 will be flashing or illuminating continuously for a predetermined duration such as a few more seconds. In one specific example, the predetermined duration during which the light element remains illuminated is in the range 2 to 5 seconds. However, any duration may be selected.

The logic controller 420 may be any number of integrated circuits useful for controlling the flashing of the lighting sources 470 in the device 400. One example of such an integrated circuit, manufactured with complementary metal-oxide semiconductor (CMOS) technology for one-time programmable, read-only memory, is Model No. EM78P153S, made by EMC Corp., Taipei, Taiwan. Other examples of integrated circuits include MC14017BCP and CD4107AF; custom or application specific integrated circuits; CMOS circuits, such as a CMOS 8560 circuit; or M1320 and M1389 RC integrated circuits made by MOSdesign Semiconductor Corp., Taipei, Taiwan. The CMOS integration circuit is small in dimensions and consumes little standby energy. Thus, it is useful in small size products and it provides useful life to the device 400.

In some embodiments, the logic controller 420 may be programmed to illuminate the lighting elements 470 in a different pattern each time it receives the short contact signal. For example, if the lighting elements 470 are outputs 1, 2, 3, 4, 5, and 6, the first time the logic controller 420 receives the short contact signal it illuminates the lights in the sequence 1-2-3-4-5-6-1-2-3-4-5-6-1-2-3-4-5-6 where the number 1, 2, 3, 4, 5, and 6 refer to LEDs 470 respectively. The logic controller 420 continues illuminating the lighting elements 470 in different patterns each time it receives a short contact signal.

The lighting sources 470 can be incorporated into the at least one shoe component independently or can be grouped together in the same shoe component to present different colors and to present different lightning patterns. FIGS. 1 and 3 show an example of the placement of the lighting sources. The components of the interactive shoe light device 400 can be placed anywhere throughout footwear. Additionally, during movement such as running or walking, a user normally strikes the heel against the ground with a sufficient force to activate the motion switch 480. The lighting elements 470 are preferably fixed on various visible parts of the shoe surface, connected to the controller 430 by wires.

All the circuits described and many other circuits may be used in achieving the result of the interactive shoe light device 400 that illuminates different lighting patterns in response to movement of a motion switch. Additionally, many of the lighting elements of the interactive shoe light device 400 may be implemented. For instance, LEDs with different colors, Ultra-violet LEDs, or other types of lamps may also be used, such as incandescent lamps or filament lamps, other electroluminescent devices (EL).

Referring to FIG. 5, in one embodiment, a switch 510 and six LEDs 520 are preferably encapsulated in the running shoe during manufacture with a battery 530. The battery 530 may be connected to be easily disconnected, replaced and connected, again by conventional means. Although it is preferred to encapsulate the LEDs 520 and the switch 510 in the shoe, these might be attached to the exterior of the shoe if desired, and the switch 510 might also be attached to the exterior. The switch whether mercury or other conventional type will be designed when using the circuitry of FIG. 5 to be "off" when the shoe is horizontal and stationary. The battery 530 which may be of any conventional type, preferably is of the lithium chloride type.

In some embodiments, the battery 530 is connected through mercury switch 510 to LEDs 520 connected in parallel. The mercury switch may be on or off depending on the positioning of the mercury therein and is arranged to be off when the shoe is horizontal and stationary. It should be noted that using this circuit may lead to premature depletion of battery power where the shoe is held or left in such a position that the mercury switch 510 remains closed. Some embodiments, as shown in FIG. 5, my include an integrated circuit used to time illumination of LEDs 520. It will be understood that, in some other embodiments, each electronic part shown in FIG. 5 may be separately incorporated into at least one shoe component. In another embodiments, each electronic part shown in FIG. 5 may be incorporated in a combination with at least one other electrical part into at least one shoe component In some embodiment, a mechanical or a piezotronic switch may be used as an alternative to mercury switch 510. In operation, in some embodiments, when motion of the shoe causes switch 510 to complete this circuit battery 530 (that is the switch is changing state from "off" to "on"); this causes transistor Tg, 540, to conduct lighting LEDs 520. The circuitry is further designed so that switch 510 must be turned off and on again before the integrated circuit can again be activated to set state. The use of the circuitry shown in FIG. 5 transcends the need for an off attitude of the shoe to conserve battery power as it ensures only one momentary illumination of the LEDs per switch 510 closure. This allows the shoe to be held or left where, due to the attitude of the shoe, switch 510 is closed without continuing illumination of the LEDs and consequent battery 530 power depletion. Examples of the battery 530 may include batteries such as CR2032, CR2450, LR44, LR03 or any other known in the art.

It is within the scope of the invention to use any other circuit, integrated or otherwise, designed to be motion activated and to time the cessation of duration of the illumination of LEDs 520 (or other light emitting source). Circuits to control the duration are of particular importance for the reasons previously explained.

Figure 6:
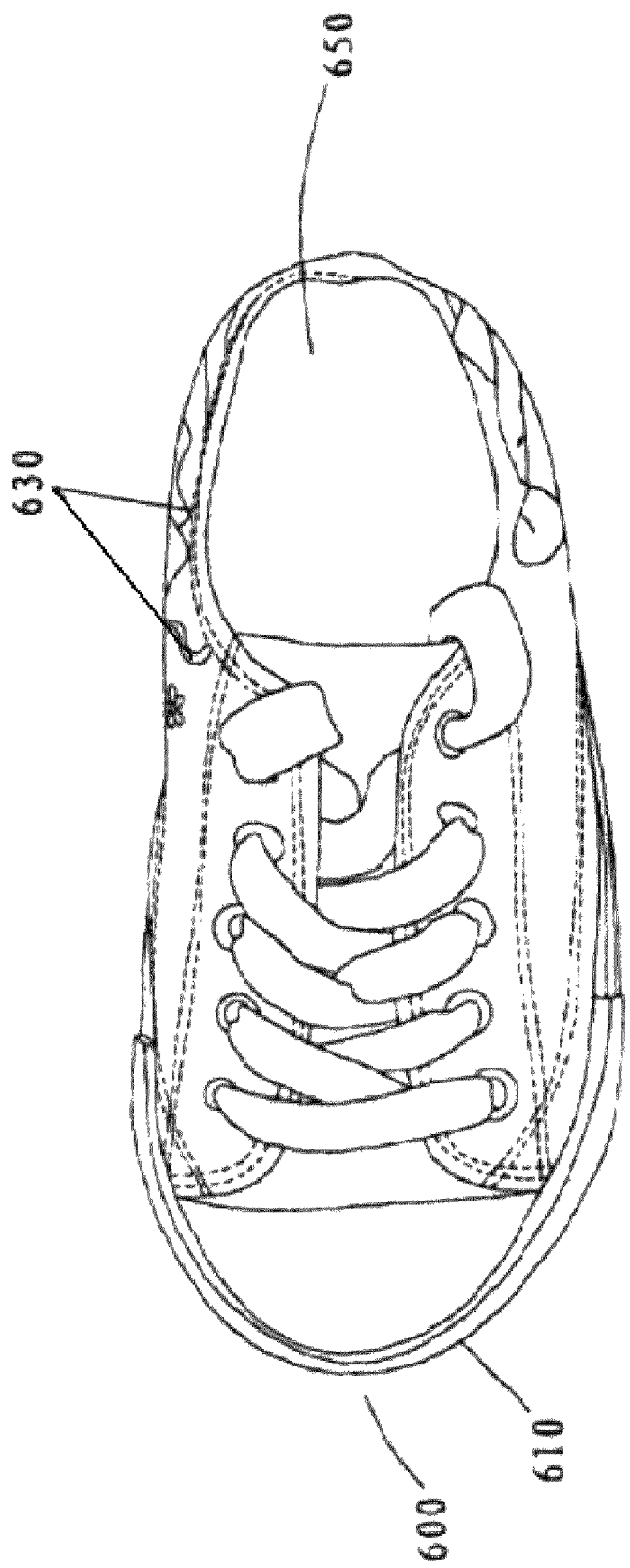
FIG. 6 shows a shoe made according to one embodiment of the present invention.

Referring to FIG. 6, a shoe 600 is made according to one embodiment of the present invention. The shoe 600 has an upper component 620 and a bottom sole 640 with a padded cushion 650. The at least one lighting source 630 that is capable of illuminating, which has been treated with the heat-resistant material, is incorporated into the upper component 620 prior to or after a vulcanization process. The lighting source 630 remains capable of illuminating after being exposed to elevated temperatures prior to or after the vulcanization process.

Figure 7:
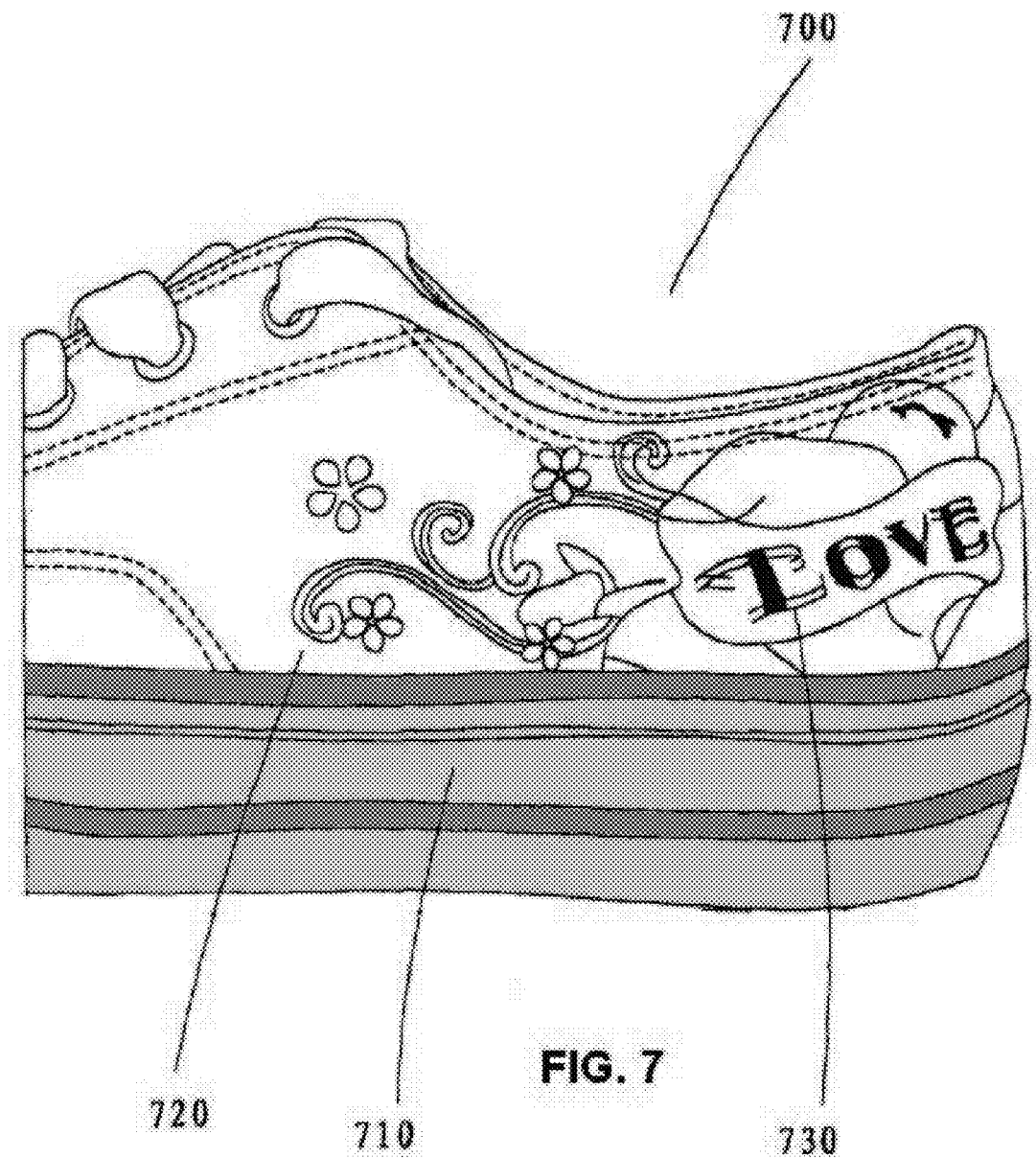
FIG. 7 shows a portion of a shoe made according to one embodiment of the present invention.

Referring to FIG. 7, a shoe 700 is made according to one embodiment of the present invention. The shoe 700 has an upper component 720 and a bottom sole 710. In one embodiment, the upper component 720. A light source 730, which have been treated with the heat-resistant material, are incorporated into the upper component 720 prior to or after a vulcanization process.

Figure 8:
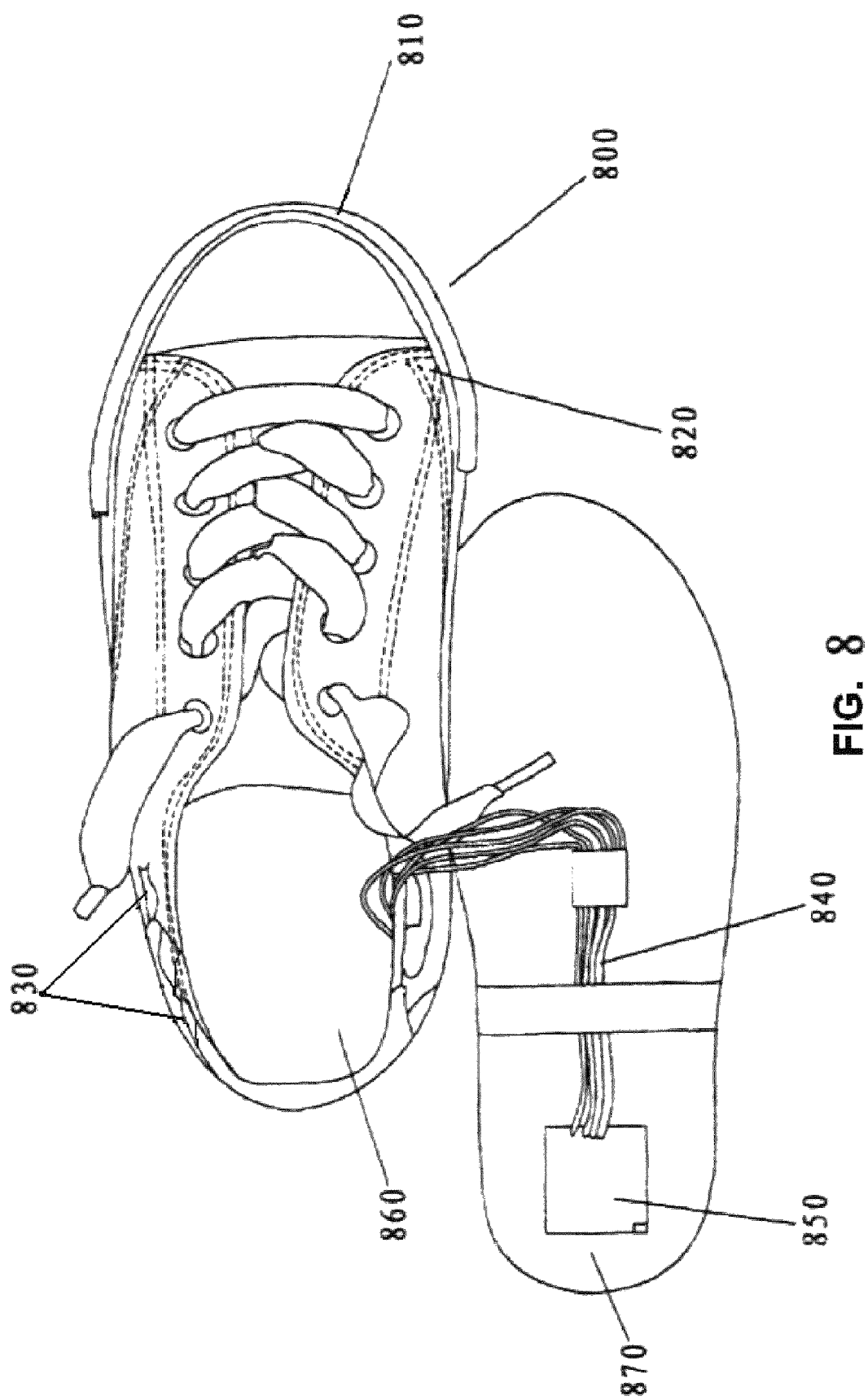
FIG. 8 shows components of a shoe made according to one embodiment of the present invention.

Referring to FIG. 8, a shoe 800 is made according to one embodiment of the present invention. The shoe 800 has an upper component 820, a bottom sole 860, and at least one layer of bonding strip (foxing) 810. FIG. 8 shows that an integral circuit/battery 850, electrical wires 840, and a section of a light source 830, capable of illuminating, has been incorporated into the bottom sole 860 shown here with a padded cushion 870 for wear comfort. The light source 830 has also been incorporated into the upper component 820. The light source 830 and/or electrical parts 840 and 850 are treated with the heat-resistant material and incorporated into the various shoe components either: (1) before they are placed into the upper 820 prior to or after a vulcanization process or (2) after they are placed into the upper 820 and the bottom sole 860 components of the shoe 800 but prior to the vulcanization process. The lighting source 830 remains capable of illuminating after being exposed to elevated temperatures prior to or after the vulcanization process.

Figure 9:
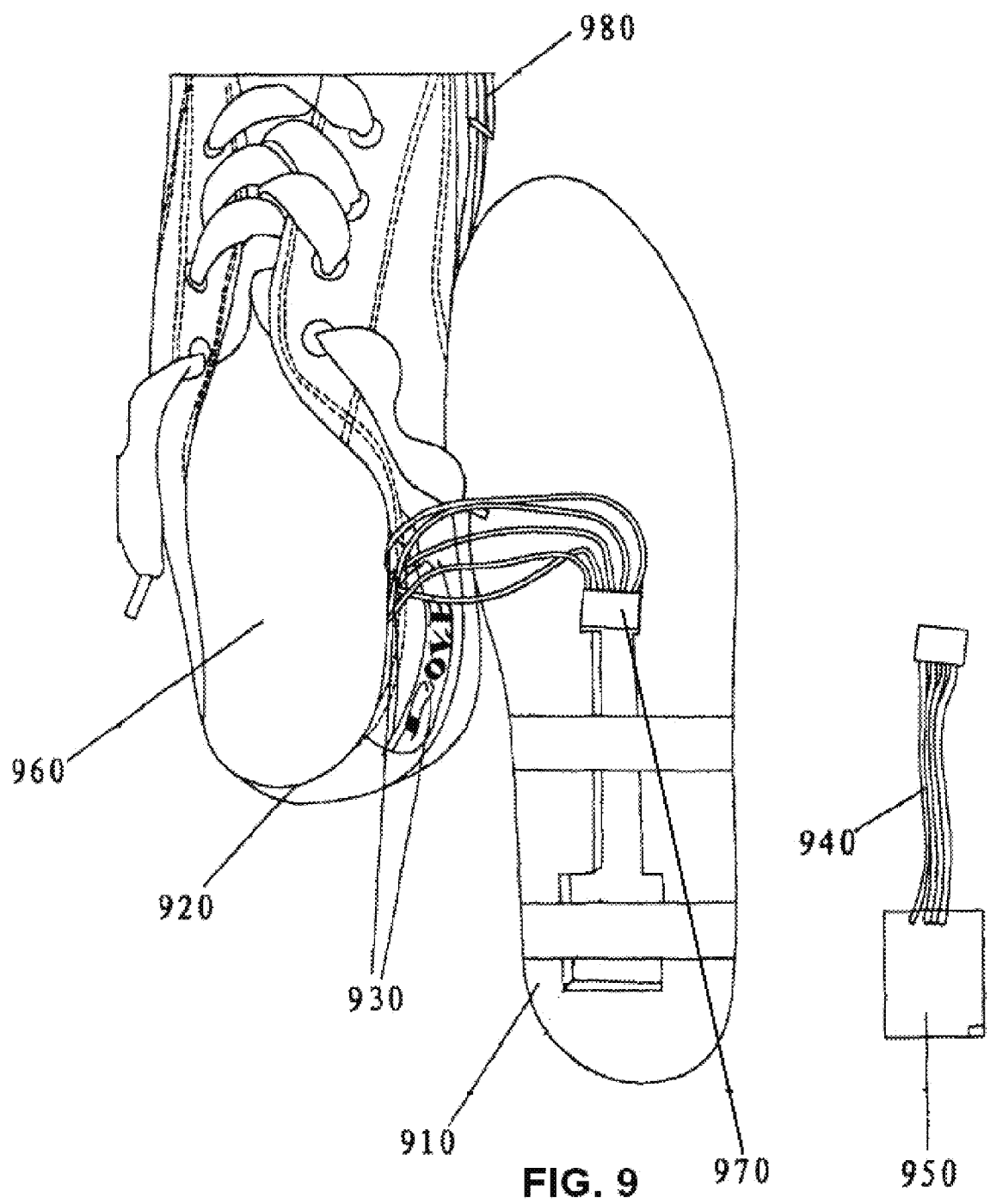
FIG. 9 shows components of a shoe made according to one embodiment of the present invention.

Referring to FIG. 9, a shoe 900 is made according to one embodiment of the present invention. The shoe 900 has an upper component 920, a bottom sole 960, and a least one layer of bonding strip (foxing) 980. FIG. 9 shows that an integral circuit/battery 950, electrical wires 940, and a section of a light source 930, capable of illuminating, that includes wires and a connector 970. The electrical parts 950, 940, and 930 have been incorporated into the bottom sole 960 with padded cushion 910 for wear comfort. The light source 930 has also been incorporated into the upper component 920. The light source 930 and/or electrical parts 940 and 950 are treated with the heat-resistant material and incorporated into the various shoe components either: (1) before they are placed into the upper 920 and the bottom sole 960 components of the shoe 900 but prior to or after a vulcanization process or (2) after they are placed into the upper 920 and the bottom sole 960 components of the shoe 900 but prior to the vulcanization process. The lighting source 930 remains capable of illuminating after being exposed to elevated temperatures prior to or after the vulcanization process.

Figure 10:
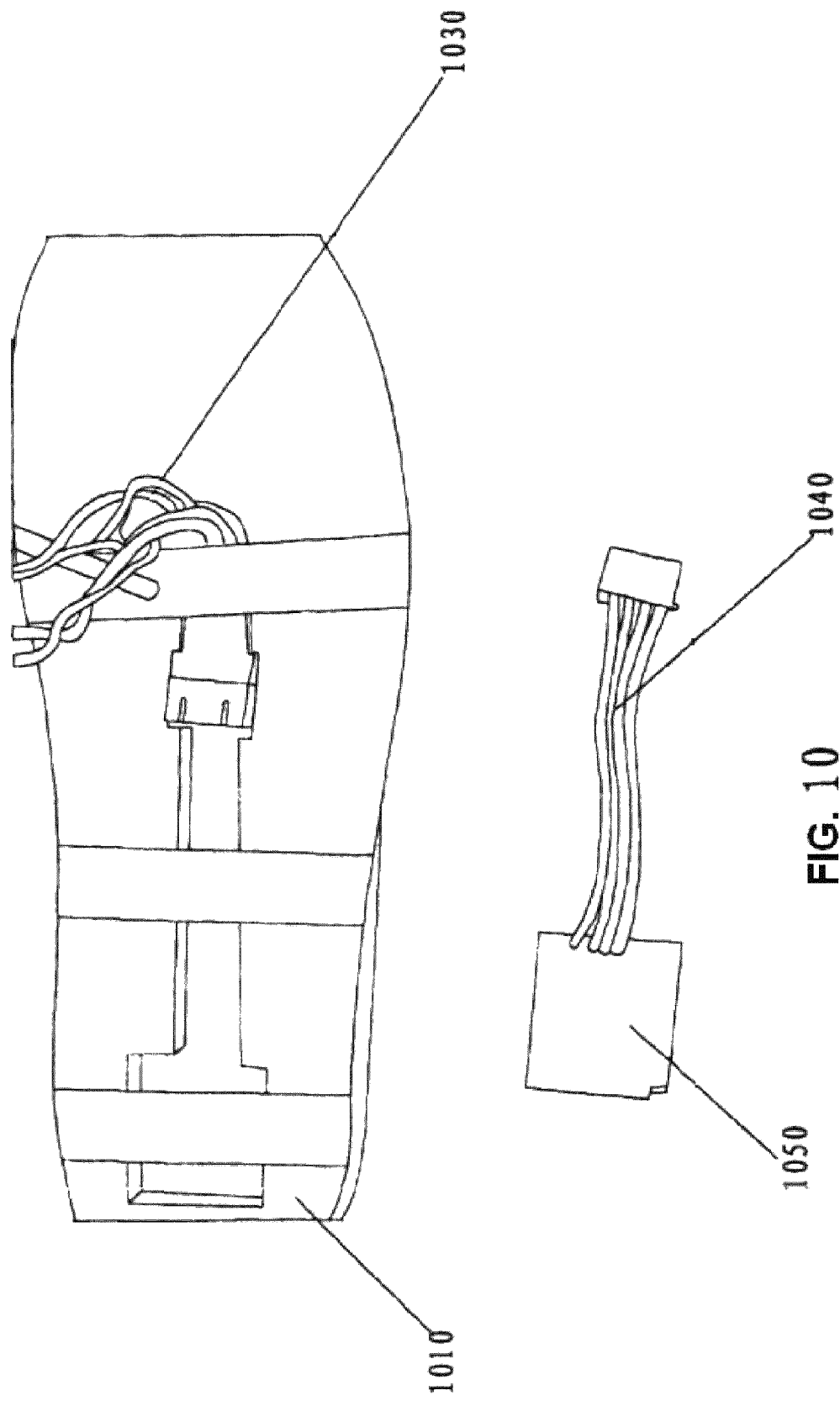
FIG. 10 shows a component of a shoe made according to one embodiment of the present invention.

FIG. 10 shows a component of a shoe made according to one embodiment of the present invention. Specifically, FIG. 10 shows a padded cushion 1010. FIG. 10 also shows that an integral circuit/battery 1050, electrical wires 1040, and a portion of a light source 1030, capable of illuminating, that would be incorporated into the padded cushion 1010 to be incorporated into bottom sole 830, 960. All or some electronic parts 1030, 1040, and 1050 may be encapsulated into the heat-resistant material either: (1) before they are placed into the padded cushion 1010 prior to or after a vulcanization process or (2) after they are placed into the padded cushion 1010 prior to the vulcanization process. The lighting source 1030 remains capable of illuminating after being exposed to elevated temperatures prior to or after the vulcanization process.

Figure 11:
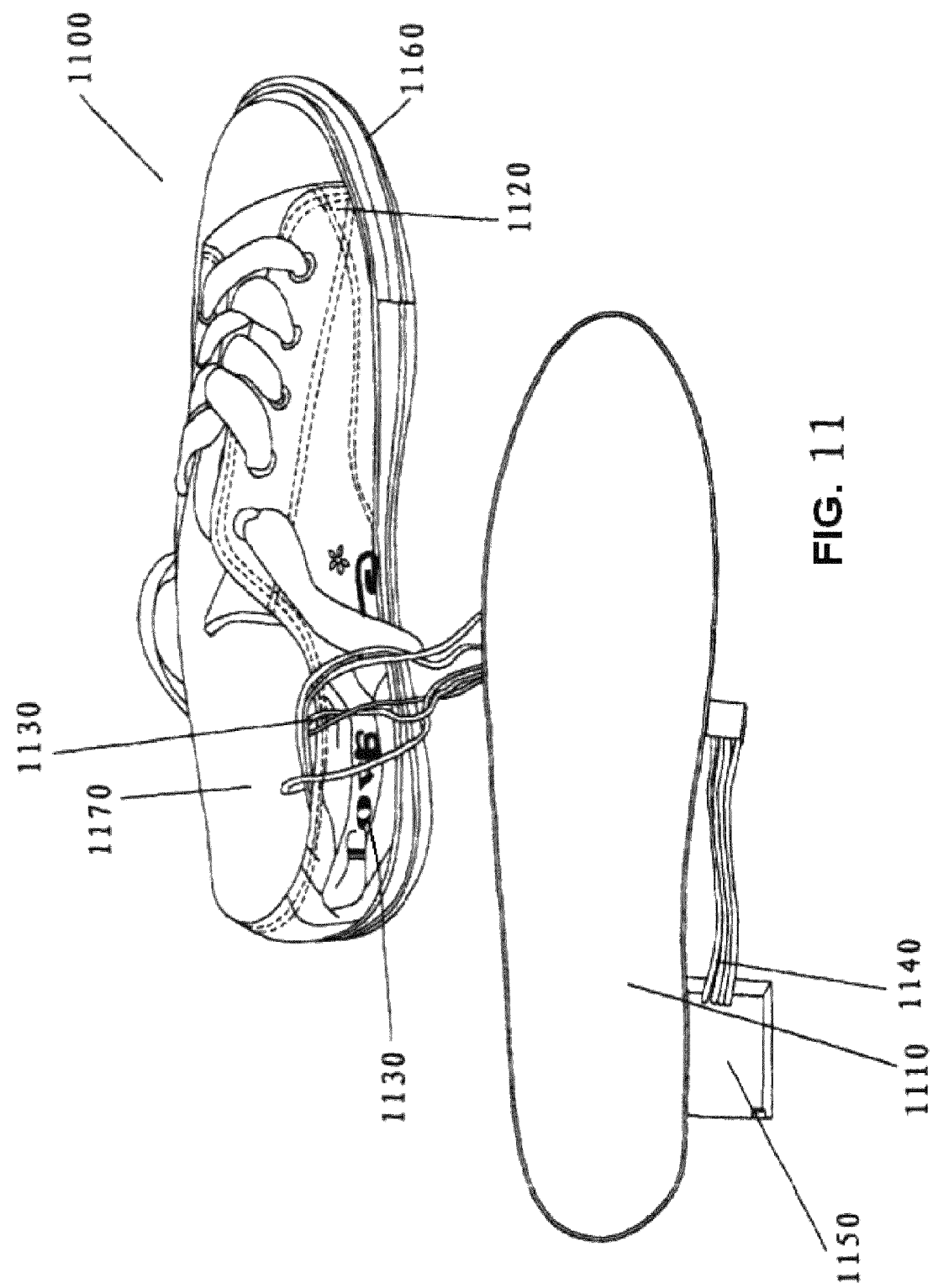
FIG. 11 shows components of a shoe made according to one embodiment of the present invention.

Referring to FIG. 11, a shoe 1100 is made according to one embodiment of the present invention. The shoe 1100 has at least an upper component 1120, a bottom sole 1170, layer of bonding strip (foxing) 1160, and a padded cushion 1110. FIG. 11 shows that an integral circuit/battery 1150, electrical wires 1140, and a portion of a light source 1130, capable of illuminating, would be incorporated into the bottom sole 1170. The light source 1130 has also been incorporated into the upper component 1120. All or some electronic parts 1130, 1140, and 1150 are treated with the heat-resistant material either: (1) before they are placed into the upper 1120 and the bottom sole 1170 and or padded cushion 1110 components of the shoe 1100 prior to or after a vulcanization process or (2) after they are placed into the upper 1120 and the bottom sole 1170 with padded cushion 1110 components of the shoe 1100 prior to the vulcanization process. The lighting source 1130 remains capable of illuminating after being exposed to elevated temperatures prior to or after the vulcanization process.

There is no limitation as to the types of footwear with which the invention may be used. Thus the footwear would include shoes, boots, overshoes, overboots, slippers, rubbers, etc. and whether designed for sports, fashion or utilitarian use. Of course, any embodiment/example described herein (or any feature or features of any embodiment/example described herein) may be combined with any other embodiment/example described herein (or any feature or features of any such other embodiment/example described herein). While a number of embodiments of the present invention have been described, it is understood that these embodiments are illustrative only, and not restrictive, and that many modifications may become apparent to those of ordinary skill in the art. For example, the electronic parts/devices may be placed into a mold to be used for forming a shoe component by inject molding or pressure molding processes.

What is claimed is:

1. A method, comprising the steps of:
  a) incorporating at least one light source in an upper part of a shoe,
    i) wherein the at least one light source comprises:
      1) a light emitting source that is capable of illuminating, wherein the light emitting source comprises a heat-resistant surface so that the heat-resistant surface protects the light emitting source's capability of illuminating from vulcanization heat,
      2) a conductive medium, and
      3) a connector,
    ii) wherein the shoe comprises:
      1) the upper part,
      2) at least one bonding strip, and
      3) a shoe bottom sole part, and
    iii) wherein the at least one bonding strip and the shoe bottom sole part are composed at least in part of a rubber composition;
  b) assembling at least the upper part having the at least one light source that is capable of illuminating with the at least one bonding strip and the shoe bottom sole part to form an assembled unit; and
  c) applying sufficient heat to vulcanize the assembled unit having the upper part having the at least one light source so as to result in securing the upper part to the at least one bonding strip and the shoe bottom sole part to form the shoe having the at least one light source that is capable of illuminating.

* * * * *